United States Patent [19]
Markovic et al.

[11] Patent Number: 5,146,384
[45] Date of Patent: Sep. 8, 1992

[54] AUTOMATICALLY RESETTING PROTECTION ARRANGEMENT FOR A TELEPHONE SUBSCRIBER LINE INTERFACE CIRCUIT

[75] Inventors: Milan Markovic, Stone Mountain; Alexander Shtulman, Tucker, both of Ga.

[73] Assignee: Northern Telecom Limited, Montreal, Canada

[21] Appl. No.: 344,380

[22] Filed: Apr. 28, 1989

[51] Int. Cl.⁵ .......................... H02H 9/04; H02H 3/20
[52] U.S. Cl. ........................................ 361/55; 361/56; 361/91; 361/119; 379/412
[58] Field of Search .................................. 361/54-56, 361/58, 91, 111, 118, 119; 379/33, 412

[56] References Cited

U.S. PATENT DOCUMENTS

| | | | |
|---|---|---|---|
| 4,106,070 | 8/1978 | Gordon et al. | 361/60 X |
| 4,408,248 | 10/1983 | Bulley et al. | 361/91 |
| 4,467,310 | 8/1984 | Jakab | 338/22 R |
| 4,695,916 | 9/1987 | Satoh et al. | 361/56 |
| 4,709,296 | 11/1987 | Hung et al. | 361/102 |
| 4,849,846 | 7/1989 | Hung et al. | 361/91 X |

FOREIGN PATENT DOCUMENTS 0142128 5/1985 European Pat. Off. .
0186873 7/1986 European Pat. Off. .
0291169 11/1988 European Pat. Off. .

OTHER PUBLICATIONS

Review of the Electrical Communication Laboratories, vol. 33, No. 2, 1985, Circuit Design of Surge Protector for 200 kb/s Ping-Pong Transmission Equipment, Kajiwara et al., p. 367 and p. 368.

*Primary Examiner*—Todd E. DeBoer
*Attorney, Agent, or Firm*—Foley & Lardner

[57] ABSTRACT

A protection arrangement for coupling a two-wire line to a SLIC includes surge protecting triacs between each wire and ground, and normally closed contacts coupling the wires to the SLIC. The triacs are triggered via varistors coupled to the wires on the SLIC side of the contacts, which are opened in response to over-voltages on the line, as detected via a diode bridge and threshold circuit. The triacs are thereby not triggered during over-voltage conditions so that their power dissipation is reduced during such faults, whereas they respond rapidly to surge conditions which accordingly need not be handled by the contacts.

17 Claims, 2 Drawing Sheets

AUTOMATICALLY RESETTING PROTECTION ARRANGEMENT FOR A TELEPHONE SUBSCRIBER LINE INTERFACE CIRCUIT

This invention relates to an automatically resetting protection arrangement for a telephone subscriber line interface circuit, referred to below as a SLIC.

It is a well known requirement to protect a SLIC, which typically contains sensitive electronic components, from excessive voltages and currents which may occur on the line to which the SLIC is connected, for example due to power line crosses and induced alternating currents from power lines. It is desirable for the protection arrangement to provide full protection to the SLIC under all common fault conditions, to accommodate various normal operating conditions in which, for example, significant but not excessive currents are induced on the line, and to reset itself automatically when a fault condition is removed. In addition, because a protection arrangement is needed for each line, important commercial requirements are that it be of low cost and of small size.

Many forms of protection arrangement have been proposed. For example, it has long been known to use so-called heat coil protectors, in which resistive heating coils are connected in series in the subscriber line wires and an excessive current produces heating to melt a fusible link and thereby protect the SLIC connected to the line. Such protectors have disadvantages in that they add to the resistance in series with the subscriber line, they can not reset themselves after a fault but instead must be manually replaced, and they are slow to respond to faults so that battery feed resistors, also connected in series with the subscriber line wires, may have to dissipate a substantial amount of power in the event of a fault.

In order to overcome some of these disadvantages, Jakab U.S. Pat. No. 4,467,310 issued Aug. 21, 1984 and entitled "Telephone Subscriber Line Battery Feed Resistor Arrangements" describes an arrangement in which a switching type PTC thermistor is connected in series with and forms part of a battery feed resistor with which it is in close thermal contact. Whilst such an arrangement is effective, it has a relatively high cost because it requires the use of closely matched thermistors in order to provide the necessary very close matching of resistances in the subscriber line wires.

Other known protection arrangements, involving for example the use of fusible solder bridges, or triggerable thyristors, involve other combinations of disadvantages such as those outlined above, the need for additional components, involving extra cost, or being subject to undesired triggering for example due to spurious and transient subscriber line voltages and currents.

To overcome many of these disadvantages, in Hung et al. U.S. Pat. No. 4,709,296 issued Nov. 24, 1987 and entitled "Protection Arrangement for a Telephone Subscriber Line Interface Circuit" there is described a protection arrangement in which the contacts of an isolation relay, already provided for the purpose of isolating the SLIC from the subscriber line, are positioned between the battery feed resistors and the remainder of the SLIC, the isolation relay being controlled via a sensing circuit to open these contacts in the event of an excessive common mode alternating current passing through the feed resistors, the sensing circuit thereafter responding to subscriber line voltage for continued control of the isolation relay. Such an arrangement, however, has certain disadvantages with regard to the independence of excessive current and voltage threshold levels, and may be subject to undesired relay chattering and latching. Furthermore, such an arrangement does not specifically provide for protection against lightning which may strike the subscriber line wires.

Various arrangements are also known for providing protection against surges due to lightning. In particular Satoh et al. U.S. Pat. No. 4,695,916 issued Sep. 22, 1987 and entitled "Protector Circuit" describes with reference to FIG. 14 thereof a protection arrangement in which a bidirectional thyristor or triac is connected between each line wire and ground and is triggered via a respective bidirectional voltage limited element, which may be a varistor, connected between the line wire and a trigger electrode of the triac. In order to satisfy numerous and increasingly stringent criteria required of a protection arrangement, the elements of such an arrangement must have a particular design, for example with respect to voltage breakdown and holding current characteristics, which can be difficult to achieve in practice.

It is also known, from Bulley et al. U.S. Pat. No. 4,408,248 issued Oct. 4, 1983 and entitled "Protection Circuit", to provide a six-diode bridge rectifier whose three a.c. terminals are connected to the two wires of a telephone subscriber line and ground, respectively. In such an arrangement protection is provided by triggering a thyristor which is connected across the d.c. terminals of the bridge rectifier.

An object of this invention is to provide an improved protection arrangement for a subscriber line interface circuit.

According to one aspect of this invention there is provided a protection arrangement for coupling telecommunications equipment to a telecommunications line, comprising: a first terminal for connection to the telecommunications line; a second terminal for connection to the telecommunications equipment; switching means closed in normal operation for coupling the first terminal to the second terminal; triggerable surge protection means coupled between the first terminal and a ground terminal; means responsive to surge voltage between the switching means and the second terminal for triggering the surge protection means into conduction; and means responsive to excessive voltage at the first terminal for opening the switching means.

In such an arrangement, the surge protection means operates rapidly in response to surge voltages on the line thereby to protect the telecommunications equipment, typically a SLIC. Power dissipation in the surge protection means is limited because the surge duration is short. The switching means remain closed during a surge, so that the switch contacts do not have to handle the very high voltages and currents which may occur during the surge. In contrast, for lower (but still excessive) voltages which may occur due for example to an a.c. power line contacting the telecommunications line and which may persist for a considerable length of time, the switching means is opened in response to the excessive voltage to protect the telecommunications equipment, and the surge protection means is quickly turned off and is no longer triggered because the triggering control therefor is derived from the equipment side of the switching means. In this case the switching means protects the surge protection means from being subject to overheating, in that the power dissipation thereof is substantially terminated.

Thus in one set of fault conditions, namely in the presence of surges, the surge protection means protects the switching means and the equipment, and in another set of fault conditions, namely overvoltages on the line, the switching means protects the surge protection means and the equipment. On termination of both sets of fault conditions, the protection arrangement automatically restores itself for normal operation.

Conveniently the surge protection means comprises a triac and the means for triggering the surge protection means comprises a bidirectional voltage-dependent element, such as a varistor.

Preferably the means responsive to excessive voltage at the first terminal for opening the switching means comprises rectifying means, coupled to the first terminal for rectifying voltage thereat to produce a rectified voltage, and means responsive to the rectified voltage exceeding a threshold level for opening the switching means.

The protection means desirably includes resistive means, preferably constituted by a battery feed resistor, via which the switching means and the surge protection means are coupled to the first terminal.

According to another aspect this invention provides a protection arrangement comprising: two first terminals for connection to a two-wire telecommunications line; two second terminals for connection to a two-wire telecommunications line interface circuit; two switching means each closed in normal operation for coupling a respective one of the first terminals to a respective one of the second terminals; two triggerable surge protection means each coupled between a respective one of the first terminals and a ground terminal; two triggering means each coupled to a respective one of the second terminals for triggering a respective one of the surge protection means into conduction for providing a surge protection path to the ground terminal; diode means for rectifying voltage at the first terminals to produce a rectified voltage; and means response to the rectified voltage exceeding a threshold level for opening the two switching means.

The invention will be further understood from the following description with reference to the accompanying drawing, in which.

Figure 1:
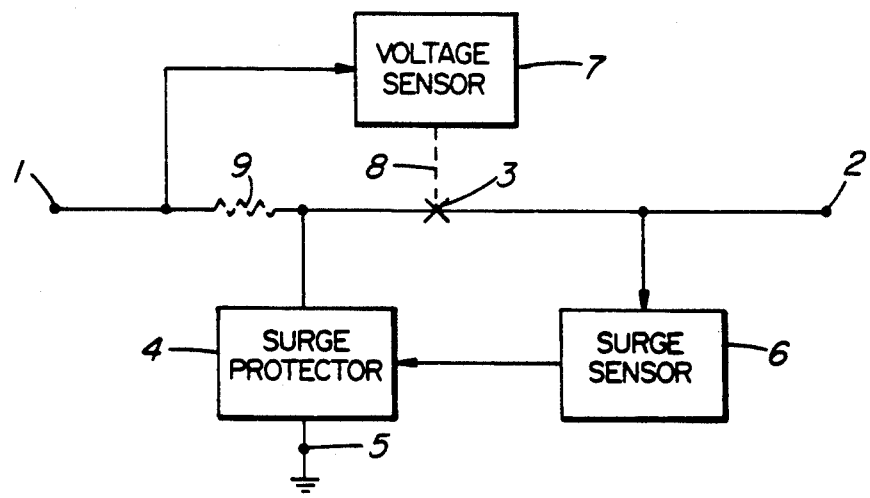
FIG. 1 illustrates in a block diagrammatic form elements of a protection arrangement in accordance with this invention.

FIG. 1 illustrates a basic form of protection arrangement in accordance with the invention, applied to a single wire line (not shown) which is connected to a first terminal 1. A second terminal 2 is connected to telecommunications equipment (not shown) which is to be protected, such as a line interface circuit. A switch 3 which is closed in normal operation couples the terminal 1 to the terminal 2. A triggerable surge protector 4 is coupled between the first terminal 1 and a grounded terminal 5, and is triggered by a surge sensor 6 in response to surge voltages present between the switch 3 and the second terminal 2, the surge sensor 6 having an input coupled to the terminal 2 for detection of such surge voltages and having an output coupled to the surge protector 4. A voltage sensor 7 has an input coupled to the first terminal 1 and serves for controlling the switch 3, as shown by a broken line 8, to open the switch 3 in the presence of a sustained excessive voltage at the first terminal 1.

Optionally, as shown by broken lines in FIG. 1, a resistance 9 may be connected in series between the first terminal 1 and the switch 3, the input of the voltage sensor 7 being connected on the terminal 1 side of this resistance and the triggerable surge protector 4 being connected on the switch 3 side of this resistance. Such a resistance 9 can be used to limit the current, and hence power dissipation, which must be accommodated by the surge protector 4 when it is triggered, and is conveniently constituted by a battery feed resistor which is normally provided in the line interface circuit. However, if the characteristics of the surge protector 4 are such that current or power dissipation limiting is not necessary, then the resistance 9 can be omitted and any battery feed resistor can be provided in conventional manner within the line interface circuit.

The operation of the arrangement of FIG. 1 will be apparent from the further description below with reference to FIGS. 2 and 3 of the drawings.

Figure 2:
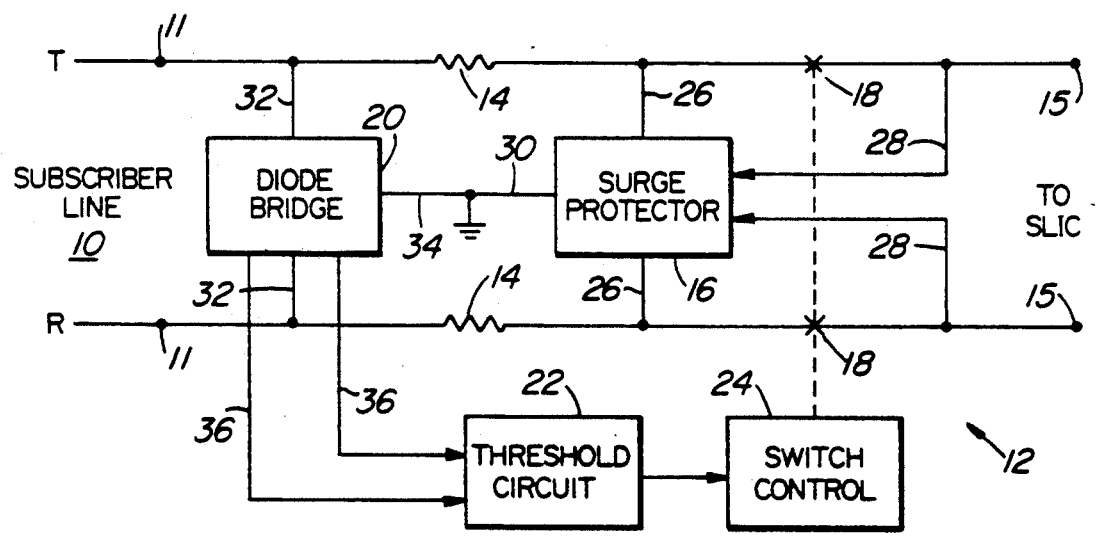
FIG. 2 illustrates in block diagrammatic form a protection arrangement in accordance with an embodiment of the invention.

Referring to FIG. 2, which shows a more typical two-wire line arrangement, the tip and ring wires T and R respectively of a telephone subscriber line 10 are coupled to first terminals 11 of a protection arrangement 12, the protection arrangement including battery feed resistors 14 and second terminals 15 for connection to a subscriber line interface circuit (SLIC) which is not shown. The protection arrangement 12 comprises a surge protector 16 and switch or relay contacts 18 which are closed in normal operation, one in series with each wire between the battery feed resistors 14 and the SLIC. In addition, the protection arrangement includes a diode bridge 20 coupled to the first terminals 11 and hence to the wires T and R, a threshold circuit 22 which is coupled to d.c. outputs of the diode bridge 20, and a switch control circuit 24 responsive to an output of the threshold circuit 22 for controlling the contacts 18, as shown by a broken line.

The surge protector 16 includes protection path connections via lines 26 to junctions between the battery feed resistors 14 and the contacts 18, and hence to the wires T and R on the line side of the contacts 18, and control connections via lines 28 to the second terminals 15, and hence to the wires T and R on the SLIC side of the contacts 18. A line 30 provides a surge protector path to a ground terminal.

Figure 3:
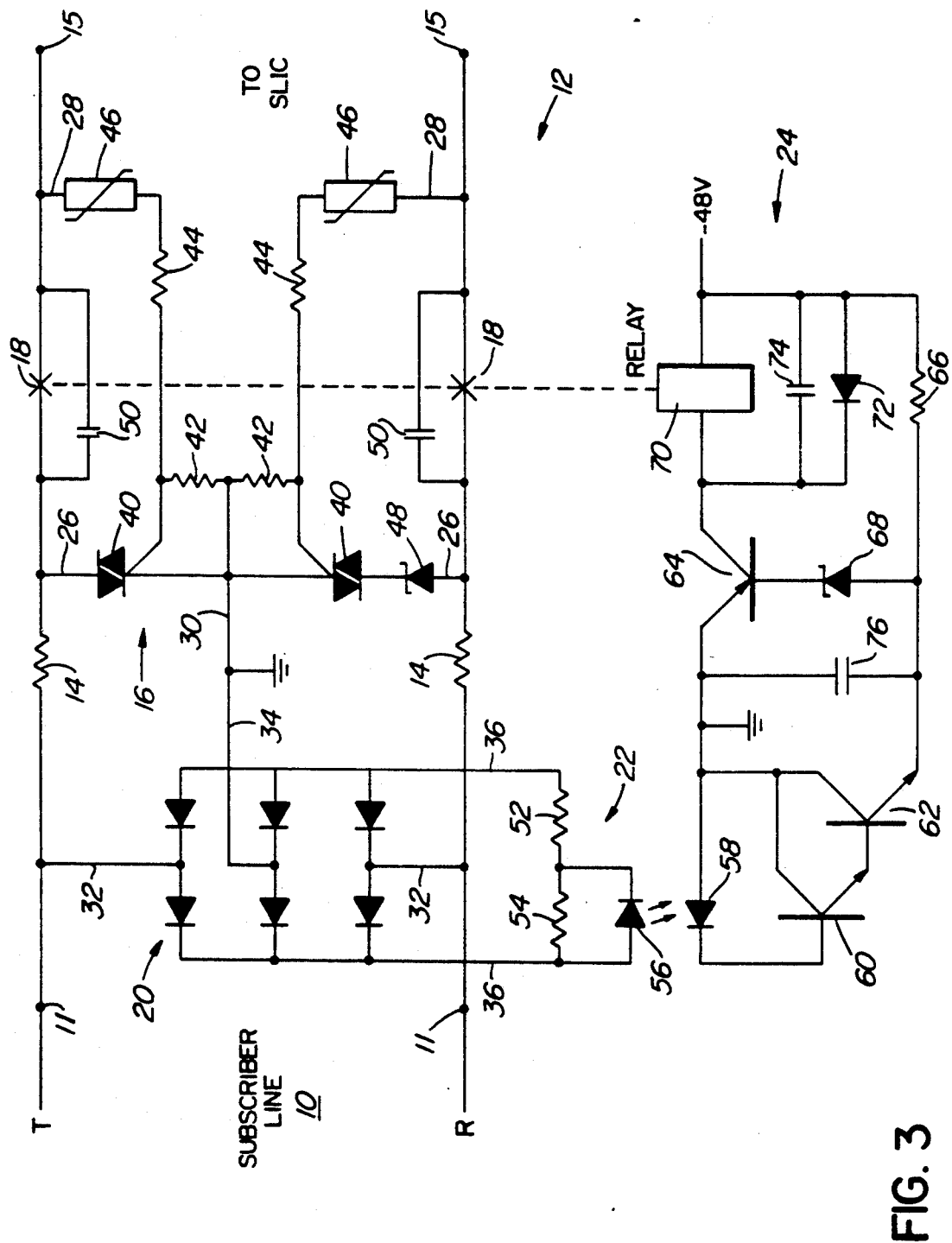
FIG. 3 schematically illustrates in more detail one form of the protection arrangement of FIG. 2.

The diode bridge 20 is a six-diode bridge, as illustrated in more detail in FIG. 3, having a three a.c. terminals connected via lines 32 to the terminals 11 and via a line 34 to the ground terminal, and having two d.c. terminals which are connected via lines 36 to the threshold circuit 22.

In operation of the protection arrangement of FIG. 2, the surge protector 16 serves rapidly to protect the SLIC from surges and other transient voltages of short duration, typically less than a duration of 5 to 10 ms. The contacts 18, controlled via the diode bridge 20, threshold circuit 22, and switch control circuit 24, serve to protect the SLIC from excessive voltages which may occur on one or both wires of the line 10 with respect to ground, or between the two wires T and R. For such protection the contacts 18 are opened, whereby voltages for triggering the surge protector 16 are removed from the control connections 28 so that the surge protector 16 typically becomes non-conductive. Thus in the event of sustained excessive voltages on the line 10 there is very little power dissipation in the surge protector 16, so that relatively small and rapid devices can be used in the surge protector 16.

Referring now to FIG. 3, in which the same references are used where applicable, a preferred form of the protection arrangement 12 will be described in greater detail.

The surge protector 16 comprises two almost identical circuits, each comprising a high power, high voltage triac 40 having a controlled path, coupled between the respective line 26 and the grounded line 30, and a control electrode or gate coupled via a resistor 42 to the grounded line 30 and via a series-connected resistor 44 and varistor 46 to the respective control path line 28. In the case of the ring wire R side of the surge protector 16, a zener diode 48 is connected between the line 26 and the triac 40 to compensate for the battery voltage, typically −48 volts, which is present on the ring wire R in normal operation. The zener diode 48, which may have a zener voltage of the order of 60 volts, serves to ensure that the ring wire triac 40 turns off when a surge voltage on the ring wire terminates, in spite of the presence of the −48 volt battery voltage on the ring wire.

The varistors 46 determine a threshold level of surge voltage above which the triacs 40 are turned on. This threshold level is, for example, greater than ringing voltages which may occur on the line 10 during normal operation. The triacs 40 are turned on by gate current supplied via, and limited by, the resistors 44, for example each having a resistance of 1 kΩ. The resistors 42, for example each having a resistance of 100Ω, provide for triggering of the triacs 40 in response to surge voltages appearing between the tip and ring wires T and R, rather than between one or both of these wires and ground.

Thus in response to surge voltages, above the threshold level set by the varistors 46, occurring on either or both of the tip and ring wires T and R, one or both of the triacs 40 is or are turned on to short the surge voltage to ground for the short duration of the surge. Upon termination of the surge voltage the triacs 40 turn off to restore normal operation. During such a surge voltage the contacts 18, which are shunted by capacitors 50 to suppress arcing, remain closed.

As described above, the diode bridge 20 comprises six diodes connected between the lines 32, 34, and 36. The threshold circuit 22 comprises a potential divider, consisting of resistors 52 and 54 having high resistances of 500 kΩ and 30 kΩ respectively to present a minimal loading to the subscriber line 10, connected between the lines 36 and an opto-coupler comprising a led (light-emitting diode) 56, a photo-diode 58 optically coupled thereto, and current amplifying transistors 60 and 62. The led 56 is connected in parallel with the resistor 54 and poled to conduct current supplied via the diode bridge 20, whereby it emits light, and the transistors 60 and 62 are consequently rendered conductive, in response to an alternating or direct voltage in excess of about 80 volts, and below the threshold level set by the varistors 46, present between the tip and ring wires T and R or between either or both of these wires and ground.

The switch control circuit 24 includes a PNP transistor 64 which is normally rendered conductive by base current supplied from the −48 volt battery supply voltage via a resistor 66, having a resistance of for example 30 kΩ, and a zener diode 68, having a zener voltage of about 5 volts, in series therewith. The transistor 64 has its emitter grounded and its collector connected via a relay coil 70, and a protective reverse-biassed diode 72 and capacitor 74 in parallel therewith, to the −48 volt supply voltage. The relay coil 70 is thereby energized in normal operation, and as indicated by the broken line in FIG. 3 controls the contacts 18 to be closed in normal operation as shown. The circuit 24 also includes a capacitor 76, for example having a capacitance of 10 μF, connected in parallel with the zener diode 68 and base-emitter junction of the transistor 64.

The collector-emitter path of the transistor 62 is also connected in parallel with the zener diode 68 and base-emitter junction of the transistor 64, so that in response to an overvoltage condition on the subscriber line 10 and consequent conduction of the transistor 62 as described above, the transistor 64 is turned off and the relay coil 70 is de-energized whereby the contacts 18 open. The capacitor 76 and the capacitor 74, having a capacitance of for example 10 μF, provide a slow response of the relay so that the contacts 18 do not open in response to a short duration surge voltage but only in response to a longer duration fault, such as may arise from a power line cross or high a.c. induced voltages on the subscriber line 10. The capacitances of the capacitors 74 and 76 may be varied to adjust this short duration, for example so that it is any desired value from 5 to 100 ms.

As a consequence of the opening of the contacts 18, triggering of the triacs 40 via the lines 28, varistors 46, and resistors 44 no longer takes place. The triacs 40 are selected to have a holding voltage which is higher than the breakdown voltage of the varistors 46, typically of the order of 300 volts, and a breakdown voltage which is much higher than this. Accordingly, for d.c. overvoltages on the line 10 below about 300 volts, and for substantially higher a.c. over-voltages on the line 10, the lack of triggering of the triacs due to the open contacts 18 causes the triacs 40 to turn off. In consequence, high power dissipation levels within the triacs 40 for sustained period are avoided.

Upon termination of the over-voltage on the line 10, the transistor 62 becomes non-conductive so that the capacitor 76 is charged via the resistor 66, turning on the transistor 64 to energize the relay coil 70 and close the contacts 18 to resume normal operation. The presence of the capacitor 76 also prevents chattering of the relay.

As in the arrangement of FIG. 1, the battery feed resistors 14 may be provided in conventional manner within the SLIC, and omitted from the protection arrangement itself, if the triacs 40 are capable of accommodating the resulting current and power dissipation levels which may occur in fault conditions.

Although particular embodiments of the invention have been described in detail above, it should be appreciated that numerous modifications, variations, and adaptations may be made thereto without departing from the scope of the invention as defined in the claims. In particular, other forms of threshold and switch control circuits may be provided, and the varistors described above may be replaced by other forms of bidirectional voltage-dependent elements, such as zener diodes. In addition, it should be appreciated that the function of the relay coil 70 and its contacts 18 can be provided by an isolation relay which may be already provided for other purposes, as described in U.S. Pat. No. 4,709,296 already referred to.

What is claimed is:

1. A protection arrangement for coupling telecommunications equipment to a telecommunications line, comprising:
    a first terminal for connection to the telecommunications line;
    a second terminal for connection to the telecommunications equipment;
    switching means closed in normal operation for coupling the first terminal to the second terminal;
    triggerable surge protection means coupled between the first terminal and a ground terminal;
    means responsive to surge voltage between the switching means and the second terminal for triggering the surge protection means into conduction; and
    means responsive to excessive voltage at the first terminal for opening the switching means.

2. A protection arrangement as claimed in claim 1 wherein the surge protection means comprises a triac and the means for triggering the surge protection means comprises a bidirectional voltage-dependent element.

3. A protection arrangement as claimed in claim 2 wherein the bidirectional voltage-dependent element comprises a varistor.

4. A protection arrangement as claimed in claim 1 wherein the means responsive to excessive voltage at the first terminal for opening the switching means comprises rectifying means, coupled to the first terminal for rectifying voltage thereat to produce a rectified voltage, and means responsive to the rectified voltage exceeding a threshold level for opening the switching means.

5. A protection arrangement as claimed in claim 1 and including resistive means via which the switching means and the surge protection means are coupled to the first terminal.

6. A protection arrangement as claimed in claim 5 wherein the surge protection means comprises a triac and the means for triggering the surge protection means comprises a varistor.

7. A protection arrangement as claimed in claim 6 wherein the means responsive to excessive voltage at the first terminal for opening the switching means comprises rectifying means, coupled to the first terminal for rectifying voltage thereat to produce a rectified voltage, and means responsive to the rectified voltage exceeding a threshold level for opening the switching means.

8. A protection arrangement as claimed in claim 2 and including resistive means via which the switching means and the surge protection means are coupled to the first terminal.

9. A protection arrangement as claimed in claim 4 and including resistive means via which the switching means and the surge protection means are coupled to the first terminal.

10. A protection arrangement comprising:
    two first terminals for connection to a two-wire telecommunications line;
    two second terminals for connection to a two-wire telecommunications line interface circuit;
    two switching means each closed in normal operation for coupling a respective one of the first terminals to a respective one of the second terminals;
    two triggerable surge protection means each coupled between a respective one of the first terminals and a ground terminal;
    two triggering means each coupled to a respective one of the second terminals for triggering a respective one of the surge protection means into conduction for providing a surge protection path to the ground terminal;
    diode means for rectifying voltage at the first terminals to produce a rectified voltage; and
    means responsive to the rectified voltage exceeding a threshold level for opening the two switching means.

11. A protection arrangement as claimed in claim 10 and including two resistive means, wherein each of the two switching means is coupled to the respective one of the first terminals via a respective one of the resistive means.

12. A protection arrangement as claimed in claim 11 wherein each of the two surge protection means comprises a triac coupled between the ground terminal and a respective junction between the resistive means and switching means.

13. A protection arrangement as claimed in claim 12 wherein one of the triacs is connected to the respective junction via a zener diode.

14. A protection arrangement as claimed in claim 13 wherein each of the two triggering means comprises a varistor and a resistor connected in series between the respective one of the second terminals and a control electrode of the respective one of the triacs.

15. A protection arrangement as claimed in claim 10 wherein each of the two triggering means further comprises a resistor connected between the control electrode of the respective one of the two triacs and the ground terminal.

16. A protection circuit for coupling telecommunications equipment to a telecommunications line comprising:
    a first terminal for connection to the telecommunications line;
    a second terminal for connection to the telecommunications equipment;
    a controllable switch closed during normal operation and during short term surge conditions to connect the first terminal to the second terminal, wherein said short term surge condition is a surge condition having duration of less than between about 5 ms and 100 ms;
    a triggerable surge protector coupled between the first terminal and ground, said surge protector providing surge protection at the first terminal;
    a surge sensor responsive to voltage at the second terminal, said surge sensor triggering the surge protector into operation;
    means for opening the switch, said means being responsive to overvoltage at the first terminal sustained for a duration greater than said short term surge condition, said opening of the switch causing the surge sensor to cease operation of the surge protector.

17. A method of protecting telecommunications equipment coupled to telecommunications lines, the method comprising the steps of:
    connecting the telecommunications line to a first terminal;
    connecting the telecommunication equipment to a second terminal;

connecting the first and second terminals to each other through a switch when operating under normal conditions and during short term surge conditions of duration between about 5 ms and 100 ms;

sensing said short term surge conditions at the second terminal and triggering a surge protector to provide surge protection at the first terminal when short term surge conditions are sensed;

sensing at the first terminal an overvoltage sustained for a duration longer than said short term surge condition and in response opening said switch and ceasing operation of said surge protector when said switch is open.

* * * * *